United States Patent [19]

Racca et al.

[11] Patent Number: 5,474,750
[45] Date of Patent: Dec. 12, 1995

[54] RESONANT POWER SUPPLY CIRCUIT FOR OZONE GENERATORS

[75] Inventors: William Racca, Riverside, R.I.; Edward F. Racca, Ashland, Mass.

[73] Assignee: Quantum Electronics Corporation, Warwick, R.I.

[21] Appl. No.: 378,324

[22] Filed: Jan. 25, 1995

[51] Int. Cl.⁶ .................................................. B01J 19/08
[52] U.S. Cl. ............................. 422/186.15; 422/186.07; 363/131
[58] Field of Search .................... 422/186.15, 186.07; 363/131

[56] References Cited

U.S. PATENT DOCUMENTS

| | | | |
|---|---|---|---|
| 3,400,071 | 9/1968 | Zwoboda | 204/317 |
| 3,496,092 | 2/1970 | Fraser | 204/312 |
| 3,691,450 | 9/1972 | Cox | 321/145 R |
| 3,703,677 | 11/1972 | Farrow | 321/45 R |
| 3,752,748 | 8/1973 | McMillan, Jr. | 204/157.1 R |
| 3,844,741 | 10/1974 | Dimitrik | 55/102 |
| 3,905,920 | 9/1975 | Botcharoff | 250/536 |
| 4,314,344 | 2/1982 | Johns et al. | 364/500 |
| 4,410,934 | 10/1983 | Fathauer et al. | 363/21 |
| 4,442,483 | 4/1984 | Baumann et al. | 363/131 |
| 4,477,868 | 10/1984 | Steigerwald | 363/28 |
| 4,538,204 | 8/1985 | Weber | 361/229 |
| 4,680,694 | 7/1987 | Huynh et al. | 363/136 |
| 4,682,266 | 7/1987 | Huynh et al. | 361/235 |
| 4,694,374 | 9/1987 | Gesslauer | 361/235 |
| 4,713,220 | 12/1987 | Hyunh et al. | 422/186.16 |
| 5,137,697 | 8/1992 | Lathan et al. | 422/186.15 |
| 5,140,223 | 8/1992 | Gesche et al. | 315/111.21 |
| 5,149,931 | 9/1992 | Magara | 219/69.13 |
| 5,339,008 | 8/1994 | Lapatovich et al. | 315/248 |
| 5,352,993 | 10/1994 | Mäder | 331/107 A |

*Primary Examiner*—Donald P. Walsh
*Assistant Examiner*—Daniel Jenkins
*Attorney, Agent, or Firm*—Barlow & Barlow

[57] ABSTRACT

An ozone generator is provided, with a resonant power circuit to energize the corona plates. The circuit includes a pair of transistors where the primary winding of the transformer acts as the collector load on each of the transistors. Additionally, two other transistors are provided for safety purposes to short the base signal of the power transistors if the power supply to the ozone generating plates gets too high. The circuit is resonant thereby requiring low power consumption. The resonant circuit takes full advantage of the characteristics of the transformer to quickly and efficiently energize the plates for the generation of corona for the purpose of creating ozone.

7 Claims, 1 Drawing Sheet

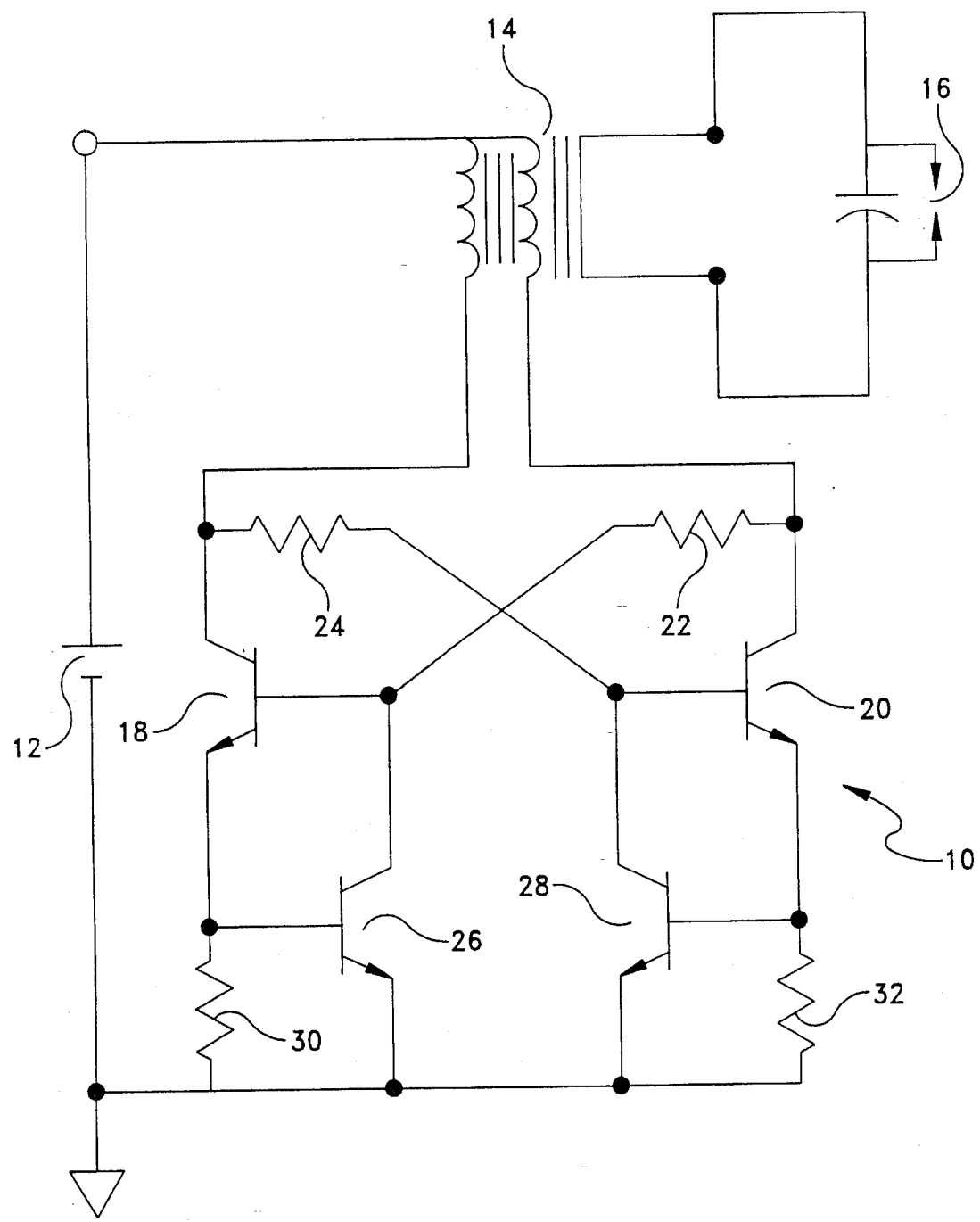

RESONANT POWER SUPPLY CIRCUIT FOR OZONE GENERATORS

BACKGROUND OF THE INVENTION

The present invention relates generally to circuits for energizing plates for the generation of a corona plasma field for the purpose of making ozone. More specifically, the present invention relates to a circuit that is resonant which takes full advantage of the characteristics of a transformer.

Power supply circuits for the generation of ozone have typically, in the past, included a pair of electrodes separated by a dielectric member which, when supplied with a high voltage AC source, will cause an electrical plasma discharge between the electrodes.

However, prior art circuits for supplying power to an ozone generator are generally non-resonant in design which requires additional components to make the circuit oscillate. Further, non-resonant circuits for supplying power to an ozone generator do not oscillate sinusoidally and therefore produce excessive electrical noise. In addition, these known prior art circuits are subject to spikes which enhances the possibility of arc generation that typically creates nitrous oxide byproducts and other noxious elements.

In the field of ozone generation, there is a concern regarding excess power consumption by the circuit which energizes the ozone plates. In the prior art, non-resonant circuits are employed to energize plates separated by a dielectric for the generation of ozone. As a result, the high voltage applied to the plates, for generation of corona, is created from circuitry that has high power losses and is inefficient for maintaining the needed oscillations.

Due to the demand for lower power consumption and improved ozone generation, a circuit which is efficient with low power consumption characteristics and the ability to take full advantage of a transformer to quickly and efficiently energize ozone plates is desired. Therefore, a circuit which overcomes problems in non-resonant circuits is desired.

SUMMARY OF THE INVENTION

The present invention preserves the advantages of prior art power supply circuits for ozone generators. In addition, it provides new advantages not found in currently available circuits, and overcomes many of the disadvantages of such currently available circuits.

The invention is generally directed to a novel and unique resonant circuit for the supply of power to energize plates for the generation of corona to form ozone. The resonant circuit of the present invention has a low power consumption yet efficiently energizes the plates for high ozone output.

The preferred embodiment of the present invention includes a DC power supply coupled to the collectors of two power transistors through the split primary winding of a transformer. The bases of the two transistors are cross coupled through two resistors to the collectors of the opposite transistors. The transformer is a resonant tank that provides the load for the two power transistors that act as the driving source for the centered tapped primary winding. Also included in the circuit are two low-power transistors to provide overload protection. The two low-power transistors couple the pair of cross coupled resistors to ground through their collector-emitter junction. The bases of the low-power transistors sense any increase in the emitter current of the high-power transistors. This circuit also provides effective control over the ozone generating capacity of the ozone generating plates connected to the transformer of the self-resonant circuit of the present invention.

It is therefore an object of the present invention to provide a circuit for energizing electrical plates separated by a suitable dielectric for the generation of ozone.

Another object of the present invention is to provide a resonant circuit for energizing ozone generating plates which has low power consumption and takes full advantage of the transformer characteristics.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a circuit diagram of a resonant power circuit for ozone generation.

DETAILED DESCRIPTION OF THE PREFERRED EMBODIMENT

Referring to FIG. 1, a resonant power supply circuit 10 For ozone generators is generally shown. The power source of the resonant power supply circuit of the present invention is driven from a DC supply 12 of a value established by the design parameters required for the given application. As can be appreciated, the output requirements required for accommodating a particular application will establish the desired value of the DC voltage 12 required to drive the circuit. The power supply circuit 10 of the present invention is improved over prior art circuits in that it has an integral pan of its design parameters established to take advantage of the characteristics of the transformer 14 itself. These particular design parameters are chosen by the circuit designer to provide a specific desired operating Frequency and the secondary of the transformer will preferably exhibit high inductance and capacitance while the core will have a high reluctance to achieve the desired results. In accordance with the invention, the parameters and necessary requirements to fire the plates 16, to provide the necessary and desired energy for the generation of ozone, can be determined. As a result, the designer can easily adjust the parameters of the circuit to realize precisely the expected generation of ozone. In a preferred form the frequency should be as high as practical, for example, 30–80 kHz. This minimizes radiated noise enhanced by the sine wave operation.

The inductance and capacitance required to place the circuit 10 of the present invention into oscillation is derived directly from that reflected from the inductance and capacitance of the secondary winding to the primary winding of the output transformer 14. Essentially, the primary winding of transformer 14 is a resonant tank that provides the load for two high-power transistors 18 and 20 that act as a multivibrator and the driving source for the center-tapped primary winding of the transformer 14. Alternatively, transistors 18 and 20 may be replaced by a pair of triodes, FETS, or the like. The DC supply 12 is coupled to the collectors of the two high-power transistors 18 and 20 through the split primary winding of the transformer 14. The bases of the two high-power transistors 18 and 20 are cross coupled through two resistors 22 and 24 from opposite collectors of the two transistors 18 and 20. In the alternative, two capacitors may be used in place of resistors 22 and 24 but would not work as well because some form of external bias would be required to provide the needed oscillation.

In addition, the circuit of the present invention also incorporates two low-power transistors 26 and 28 to provide effective overload protection for the resonant power supply circuit 10. The two low-power transistors 26 and 28 couple the cross coupled resistors 22 and 24 to ground through the collector-emitter junction of transistors 26 and 28. The bases of the low-power transistors 26 and 28 sense any increase in emitter current of the high-power transistors 18 and 20. In the event an increase in the emitter current of the high-power transistors 18 and 20 is sensed, the collector-emitter junction of the low-power transistors 26 and 28 effectively ground out the base of the high-power transistors 18 and 20 to shut down the circuit thereby preventing any damage to circuit 10. Resistors 30 and 32 provide, in conjunction with transistors 26 and 28, control over the input to the base of the power transistors 18 and 20 in the event of an increase in emitter current. As a result, the circuit provides effective control over the ozone generating capacity of the self-resonant circuit 10 in conjunction with a regulator circuit that is employed to prevent the DC voltage 12 from exceeding the specified parameters imposed on the generating circuit.

In the design of the resonant power supply circuit of the present invention, a fundamental parameter must be determined prior to preceding with the final design of the circuit 10 to establish the basic self-resonant frequency of the circuit 10 to be designed and then incorporate that information into the development of the transformer 14 itself. In prior art circuits for ozone generators, the application of one basic parameter to accomplish another is typically missed or incorrectly selected. Since the resonant power supply circuit of the present invention employs a minimal number of components which are directly related to the generation of ozone, the circuit 10 can easily and simply be designed to achieve predictable and accurate results with high as reliability. In particular, taking advantage of the self-resonant characteristic of the transformer 14, and the selection of components to prevent saturation, the circuit will oscillate sinusoidally without the production of excessive electrical noise or unwanted spikes which typically generates arcs with noxious bioproducts. The circuit 10 of the present invention employs the design technique of taking advantage of the self-resonance of the circuit with the ability to operate at a higher frequency with a minimal amount of circuitry to achieve high reliability and efficiencies at a low voltage. As a result of the circuit 10 of the present invention and its higher operating frequency, smaller ozone generating plates 16, connected to transformer 14 as a load, may be employed to produce the equivalent amounts of ozone generated by larger plates employing prior art circuitry.

In the preferred embodiment of the present invention, the circuit 10 operates above 30kH$_z$ with the transformer 14 having the ratio of the primary winding to the secondary winding being 1:400. In a preferred embodiment, resistors 22 and 24 are 3.3 k$\Omega$ while resistors 30 and 32 are 0.82 $\Omega$ each. High-power transistors 18 and 20 have a medium B such as type D44H11 and low-power transistors 26 and 28 may be type 2N3904. Further, the DC voltage of power supply 12 is preferably in the range of 9–13 volts to effectively drive the circuit 10 described above, limited by the $V_{CE}$ of the transistors used. The above specific circuit is an example of how the invention can be employed. Circuit parameters may be modified for different applications of the circuit.

It will be appreciated by those skilled in the art that various changes and modifications can be made to the illustrated embodiments without departing from the spirit of the present invention. All such modifications and changes are intended to be covered by the appended claims.

What is claimed is:

1. In an ozone generator a transformer having a pair of primary windings and a secondary winding coupled by a high reluctance core, the secondary winding being connected to a pair of plates capable of generating corona, a multivibrator coupled to the primary windings having a first switch that conducts through a first primary in one direction and a second switch that conducts through the other primary in the other direction, the secondary winding having a resonant network that is reflected in the primary winding whereby substantially a sine wave is generated.

2. In an ozone generator a resonant power supply circuit comprising:

a direct current source having a positive terminal and a negative terminal;

a transformer having a center tapped primary winding and a secondary winding;

a pair of high-power transistors; said positive terminal being connected to the collectors of said high-power transistors through said center tap of the primary winding of the transformer;

a first pair of resistors; bases of said high-power transistors being cross coupled through said first pair of resistors to collectors of said high-power transistors;

a pair of low-power transistors; said low-power transistors coupling said first pair of resistors to ground through the collector-emitter junction of said low-power transistors, respectively; and a pair of plates separated by a suitable dielectric capable of generating corona for the production of ozone connected across the secondary winding.

3. The circuit of claim 2, wherein said transformer has a ratio of primary winding to secondary winding of 1:400.

4. The circuit of claim 2, wherein said first pair of resistors are each 3300 ohms.

5. The circuit of claim 2, wherein said second pair of resistors are each 0.82 ohms.

6. The circuit of claim 2, wherein said high-power transistors are each D44H11.

7. The circuit of claim 2, wherein said low-power transistors are each 2N3904.

* * * * *